United States Patent
Fujimura

(10) Patent No.: US 8,568,101 B2
(45) Date of Patent: Oct. 29, 2013

(54) FAN ROTOR BLADE SUPPORT STRUCTURE AND TURBOFAN ENGINE HAVING THE SAME

(75) Inventor: Tetsuji Fujimura, Tokyo (JP)

(73) Assignee: IHI Corporation, Tokyo (JP)

( * ) Notice: Subject to any disclaimer, the term of this patent is extended or adjusted under 35 U.S.C. 154(b) by 960 days.

(21) Appl. No.: 12/526,838

(22) PCT Filed: Mar. 27, 2007

(86) PCT No.: PCT/JP2007/056318
§ 371 (c)(1),
(2), (4) Date: Aug. 12, 2009

(87) PCT Pub. No.: WO2008/117413
PCT Pub. Date: Oct. 2, 2008

(65) Prior Publication Data
US 2010/0034659 A1    Feb. 11, 2010

(51) Int. Cl.
*F01D 5/30* (2006.01)
*F04D 29/34* (2006.01)

(52) U.S. Cl.
USPC .................................. 416/204 A; 416/244 A

(58) Field of Classification Search
USPC .............. 416/204 A, 219 R, 220 R, 239, 240, 416/244 A, 248
See application file for complete search history.

(56) References Cited

U.S. PATENT DOCUMENTS

| 4,730,983 | A  | * | 3/1988  | Naudet et al.    | 416/220 R |
| 5,052,893 | A  | * | 10/1991 | Catte            | 416/220 R |
| 6,764,282 | B2 |   | 7/2004  | Suciu et al.     |           |
| 7,748,950 | B2 | * | 7/2010  | Kodama et al.    | 415/72    |
| 2003/0099543 | A1 | * | 5/2003 | Freeman et al.  | 415/199.4 |
| 2005/0254952 | A1 | * | 11/2005 | Stone           | 416/219 R |

FOREIGN PATENT DOCUMENTS

| JP | 10-169103   | 6/1998  |
| JP | 2000-320492 | 11/2000 |
| JP | 2004-027854 | 1/2004  |
| JP | 2004-301122 | 10/2004 |

OTHER PUBLICATIONS

International Search Report issued in corresponding application No. PCT/JP2007/056318, completed Apr. 12, 2007 and mailed Apr. 24, 2007.

* cited by examiner

*Primary Examiner* — Edward Look
*Assistant Examiner* — Jason Davis
(74) *Attorney, Agent, or Firm* — Griffin & Szipl, P.C.

(57) ABSTRACT

The fan rotor blade (73) has a root (73a) located at an end at the side of a rotary disk (75), and a tip (73b) located at an outer end in a radial direction of the rotary disk (75), and extends from the root (73a) to the tip (73b). The root (73a) has an attached part (93) attached to a rotor blade fixing part (75a) of the rotary disk (75), and an extension part (95) extending from the attached part (93) toward the upstream side. An upstream end of the extension part (95) is a free end.

3 Claims, 12 Drawing Sheets $T_2 > T_1$ $H_2 > H_1$ $B_1 > B_2$ $H_1 > H_2$ $L_1 > L_2$

FAN ROTOR BLADE SUPPORT STRUCTURE AND TURBOFAN ENGINE HAVING THE SAME

This is a National Phase Application in the United States of International Patent Application No. PCT/JP2007/056318 filed Mar. 27, 2007, the entire disclosure of which is hereby incorporated by reference.

BACKGROUND OF THE INVENTION

1. Technical Field of the Invention

The present invention relates to a turbofan engine. Additionally, the present invention relates to a structure which can be applied to a turbofan engine, and a fan rotor blade support structure for fixing a fan rotor blade for air introduction to a rotary disk to support this rotary disk.

2. Description of the Related Art

FIG. 1 is a schematic configuration diagram of a turbofan engine. As shown in this drawing, the turbofan engine 10 is provided with a fan rotor blade 1 for introducing air, a compressor 3 for compressing the introduced air, a combustor 5 for burning a fuel by the compressed air, a turbine 7 for driving the fan rotor blade 1 and the compressor 3 by a combustion gas of the combustor 5, an after burner 9 for afterburning to increase a thrust, a fuel nozzle (13), an ignition port (15), an outer duct (17) and the like. The fan rotor blade 1 is fixed to a rotary disk (not shown) which rotates integrally with the turbine 7.

The turbofan engine is a kind of a turbojet engine in which the size of the fan 1, which introduces air is increased, and a bypass ratio is increased. The bypass ratio corresponds to a flow rate ratio (bypass flow/core flow) between an air flow (a core flow) flowing into a core engine (the compressor 3, the combustor 5, and the turbine 7 described above) and a bypass flow bypassing them. There is an obtained effect of reducing the flow speed of an exhaust jet and lowering the noise level and fuel consumption, in accordance with an increase in the ratio.

[Problem 1]

However, in the above-described turbofan engine, when the bypass ratio is increased in order to attain a low fuel consumption and a low noise level, a first-stage fan rotor blade (an up-front fan blade) and the inner diameter of a casing surrounding the rotor blade are increased (refer to a two-dot chain line of FIG. 3, which will be described later), and the weight of the engine is increased (Problem 1). The details are as follows.

A first-stage fan rotor blade 1 of the structure embedded in a spinner 23 (refer to FIG. 1) of a turbofan engine requires a certain degree of hub/tip ratio (inlet hub radius/tip radius shown in FIG. 2: usually about 0.3) due to its embedded structure. Meanwhile, fan inlet area becomes narrow by the area equivalent to the inlet hub diameter.

Therefore, when the fan inlet area is increased in order to increase the bypass ratio, it is necessary to increase the fan diameter. In this case, since the inlet hub diameter also increases with the increase in the fan diameter in order to secure a hub/tip ratio of about 0.3, the weight of the engine will increase.

A technique for solving this Problem 1 is described in Patent Document 1.

In Patent Document 1, as shown in FIG. 3, a turbofan engine is provided with a first-stage fan rotor blade 27 for introducing air, and the spinner 23 which rotationally drives the first-stage fan rotor blade 27, and the spinner 23 has a spiral blade 29 which spirally extends radially outward from the Z axis, and sucks air from the front surface of the spinner to supply the air to the first-stage fan rotor blade 27.

In addition, in this drawing, reference numerals 31 and 31' represent a casing inner diameter, and reference numeral 33 represents the flow of inflow air.

According to the configuration of Patent Document 1, the spinner 23 has the spiral blade 29 which spirally extends radially outward from the Z axis, and sucks air from the front surface of the spinner to supply the air to the first-stage fan rotor blade 27. Thus, air can be sucked even from the front surface of the spinner equivalent to the inlet hub diameter, and this air can be compressed and supplied to the first-stage fan rotor blade 27.

Accordingly, since the total area ahead of the engine becomes the air inflow area of the first-stage fan rotor blade 27, the fan diameter can be made small, and the suction flow rate of the first-stage fan rotor blade 27 can be increased. This can increase the bypass ratio, and reduce the engine weight. In addition, the first-stage fan rotor blade 27 and the spiral blade 29 are integrally formed to constitute the fan rotor blade.

Although Problem 1 can be solved by Patent Document 1 as described above, another problem 2 occurs when the following dovetail part and dovetail groove are used.

It is necessary to attach the fan rotor blade of the turbofan engine to the periphery of a disk (or spinner) which is rotationally driven by the turbine. Therefore, an attached part provided at the root of the fan rotor blade is attached to a fan rotor blade fixing part of the rotary disk. In the conventional technique, a dovetail part which extends in a front-back direction is provided at the root of the fan rotor blade as an attached part, and a dovetail groove is provided at the periphery of the disk as the fan rotor blade fixing part, and the dovetail part is made to fit into the dovetail groove.

In this conventional structure, the dovetail part and the dovetail groove are provided parallel to the axis of rotation Z-Z of the disk so that the centrifugal force which acts on the fan blade, does not generate an axial component force. Hereinafter, this structure is called "parallel dovetail structure".

[Problem 2]

However, when an inner diameter of a doughnut-like flow passage where the fan blade is provided largely changes, and the parallel dovetail structure is adopted, it is necessary to reduce the diameters of the dovetail part and the dovetail groove to be equal to or less than the minimum diameter of the flow passage, and the length from the dovetail part to a blade tip at a radial outside end increases. As a result, there is a possibility that an excessive stress may be generated in the attached part (dovetail part) and the fan rotor blade fixing part (dovetail groove)(problem 2).

For this reason, a dovetail structure where the dovetail part and the dovetail groove, which are shown in FIG. 4, are inclined with respect to the axis of rotation is suggested (for example, Patent Document 2). In this drawing, reference numeral 35 represents a disk, reference numeral 37 represents a blade, 39 represents a dovetail, and reference numeral 41 represents a tab.

Hereinafter, this structure is called "inclined dovetail structure".

[Problem 3]

However, when a fan rotor blade having a hub/tip ratio of 0 to 0.35 is applied to the inclined dovetail structure of Patent Document 2, the centrifugal force generated at a front part (part equivalent to the above-described spiral blade) of the fan rotor blade cannot be supported.

Thus, the inventor of the present application has studied the following configuration. That is, the inventor has studied that the front end of the root of the fan rotor blade is engaged and coupled with the spin cone fixed to the rotary disk on the upstream side of the rotary disk, and thereby, the centrifugal force which acts on the front part of the fan rotor blade with a small hub diameter is supported via the spin cone. (In addition, this configuration is the content which is not opened to the public on the filing date of the present application)

[Problem 4]

In this case, however, the centrifugal force of the front part is supported by the spin cone. Thus, an excessive stress may be locally generated in the spin cone (particularly, in an uppermost stream engaging part between the fan rotor blade and the spin cone) (Problem 4).

[Patent Document 1]
Japanese Patent Application Laid-Open Publication No. 2004-27854 "TURBOFAN ENGINE"

[Patent Document 2]
U.S. Pat. No. 6,764,282 "BLADE FOR TURBINE ENGINE"

SUMMARY OF THE INVENTION

Then, an object of the invention is to provide a fan rotor blade support structure which can simultaneously solve the above-mentioned Problems 2 to 4 even when the hub/tip ratio of a fan rotor blade is set to 0.35 or less.

That is, the object of the invention is to provide a fan rotor blade support structure which can, even when the hub/tip ratio of the fan rotor blade is set to 0.35 or less, prevent an excessive stress from being generated at a root of the fan rotor blade and prevent an excessive stress from being generated in a spin cone while properly supporting the centrifugal force of a front part of the fan rotor blade.

Additionally, another object of the invention is to provide a turbofan engine which can, even when the hub/tip ratio of the fan rotor blade is set to 0.35 or less, prevent an excessive stress from being generated at a root of the fan rotor blade and prevent an excessive stress from being generated in a spin cone while properly supporting the centrifugal force on the front part of the fan rotor blade.

In order to achieve the above object, according to the invention, a fan rotor blade support structure for fixing a fan rotor blade for air introduction to a rotary disk to allow the rotary disk to support the fan rotor blade, wherein the fan rotor blade has a root located at an end at the side of the rotary disk, and a tip located at an outer end in a radial direction of the rotary disk, and extends from the root to the tip, and the root has an attached part attached to a rotor blade fixing part of the rotary disk, and an extension part extending from the attached part toward the upstream side, and an upstream end of the extension part is a free end. Preferably, the attached part is located radially outside the free end of the extension part, In the above fan rotor blade support structure, the upstream end of the extension part provided at the root of the fan rotor blade is a free end. Accordingly, the centrifugal force which acts on this free end can be properly supported by the rotary disk via the attached part.

Additionally, when the attached part is located radially outside the free end of the extension part, the distance between the attached part (or the root) and the tip can be made relatively small. Thus, excessive stress can be prevented from being generated in the attached part.

Moreover, the upstream end of the extension part of the root is not engaged (coupled) with a member (for example, the spin cone) located at the upstream end of the rotary disk, but is used as the free end. Thus, the centrifugal force which acts on this free end does not directly act on the above member such as the spin cone. Accordingly, excessive stress can be prevented from being generated in the above member, such as the spin cone.

Consequently, even when the hub/tip ratio of the fan rotor blade is set to 0.35 or less by the above fan rotor blade support structure, an excessive stress can be prevented from being generated at the root of the fan rotor blade and an excessive stress can also be prevented from being generated in the spin cone while properly supporting the centrifugal force on the front part of the fan rotor blade.

According to a preferred embodiment of the invention, the extension part has a radial inside surface, and a rib protruding radially inwards from the radial inside surface.

In this configuration, the rib protruding radially inwards from the radial inside surface of the extension part is provided. Accordingly, deformation caused by the centrifugal force on the front part of the fan rotor blade which extends radially outward from the extension part can be suppressed by the rib.

In order to achieve the above object, according to the invention, a turbofan engine comprising: a fan rotor blade for sucking air; a compressor for compressing the air from the fan rotor blade; a combustor for burning the compressed air from the compressor; a turbine rotationally driven by the combustion gas from the combustor; and a rotary disk coupled with the turbine, rotating integrally with the turbine, and having the fan rotor blade attached to the outer circumferential part thereof, wherein the fan rotor blade has a root located at an end at the side of the rotary disk, and a tip located at an outer end in a radial direction of the rotary disk, and extends from the root to the tip, and the root has an attached part attached to a rotor blade fixing part of the rotary disk, and an extension part extending from the attached part toward the upstream side, and an upstream end of the extension part is a free end.

In the above turbofan engine, the same effects as those of the above fan rotor blade support structure can be obtained.

Even when the hub/tip ratio of the fan rotor blade is set to 0.35 or less, an excessive stress can be prevented from being generated at the root of the fan rotor blade and an excessive stress can also be prevented from being generated in the spin cone while properly supporting the centrifugal force on the front part of the fan rotor blade.

DESCRIPTION OF THE PREFERRED EMBODIMENT

Figure 1:
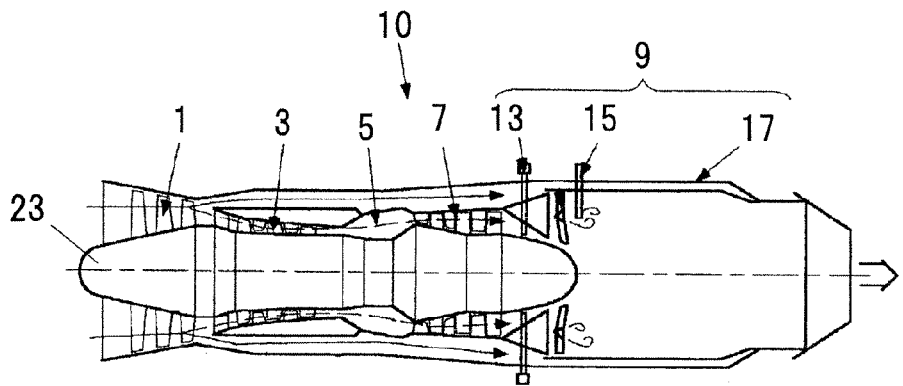
FIG. 1 is a longitudinal sectional view showing the configuration of a turbofan engine.
Figure 2:
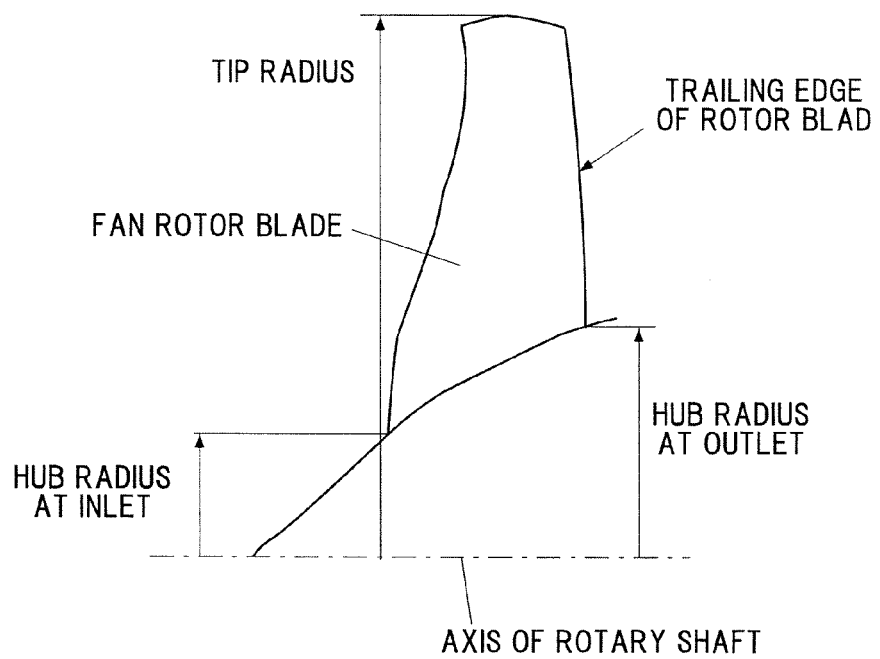
FIG. 2 is an explanatory view of a hub/tip ratio.
Figure 3:
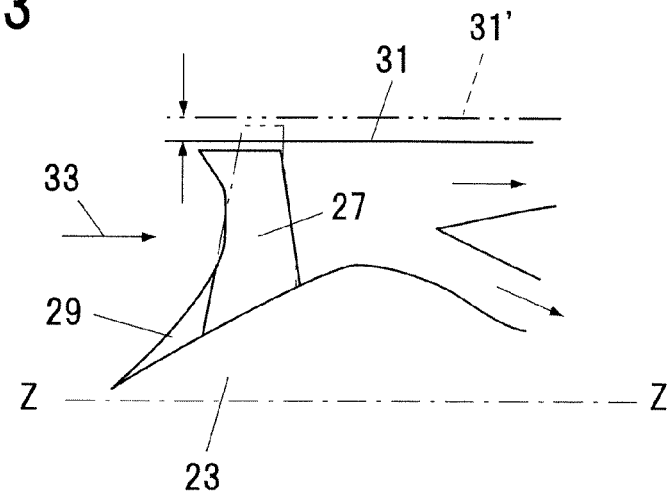
FIG. 3 is a longitudinal sectional view showing the configuration of a "turbofan engine" of Patent Document 1.
Figure 4:
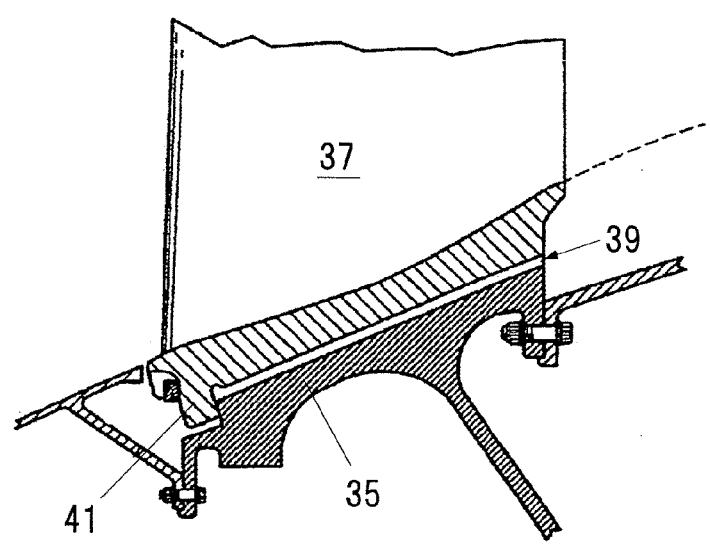
FIG. 4 is a longitudinal sectional view showing the configuration of an "inclined dovetail structure" of Patent Document 2.

Hereinafter, a preferable embodiment of the invention will be described with references to the drawings. Additionally, in the respective drawings, the same reference numerals will be given to common portions, and the duplicate description thereof will be omitted.

Embodiment

Figure 5:
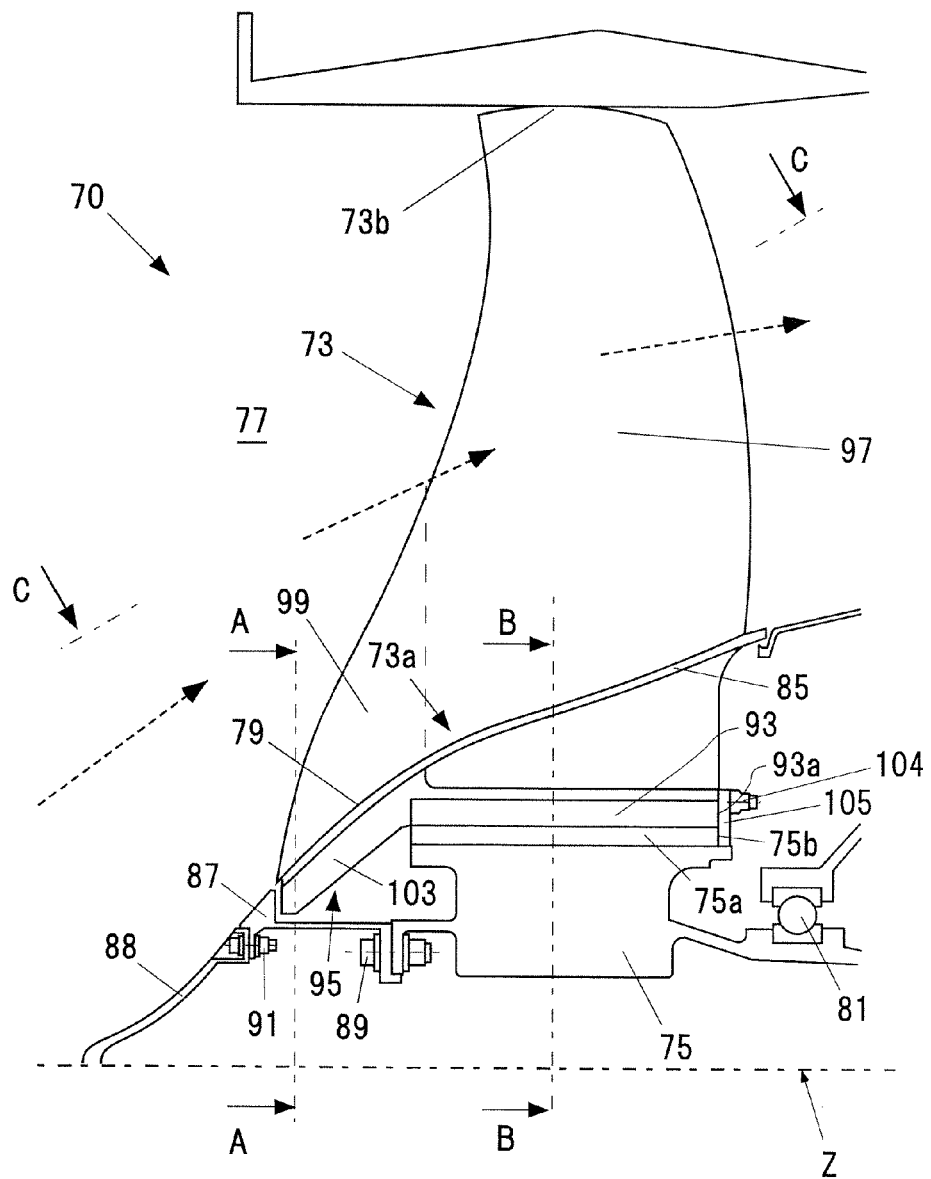
FIG. 5 is a longitudinal sectional view showing a fan rotor blade support structure according to an embodiment of the invention.

FIG. 5 is a longitudinal sectional view showing a fan rotor blade support structure according to an embodiment of the invention. The fan rotor blade support structure 70 is a structure for fixing a fan rotor blade 73 for air introduction to a rotary disk 75 to allow the rotary disk 75 to support the fan rotor blade 73.

In FIG. 5, Z represents the axis of a rotary shaft, 77 represents an airflow passage, 79 represents an inner circumferential surface of the airflow passage 77, and 81 represents a bearing which rotatably supports the rotary disk 75. Additionally, in this drawing, 85 represents a platform part which constitutes the inner circumferential surface 79 of the airflow passage 77.

The fan rotor blade 73 of FIG. 5 is one which is located on the uppermost stream side of the fan rotor blades 1 provided on the upstream side of the compressor 3 in FIG. 1. Additionally, a plurality of fan rotor blades 73 is provided in the circumferential direction, and each fan rotor blade 73 is attached to a rotor blade fixing part 75a of the rotary disk 75. Additionally, a spin cone 87 is provided on the upstream side in the axial direction of the rotary disk 75, and the spin cone 87 is fixed to the rotary disk 75 by a connecting fitting 89 (for example, a bolt, a nut). Moreover, a cone head 88 is provided at an upstream end of the spin cone 87, and the cone head 88 is fixed to the spin cone 87 by a connecting fitting 91 (for example, a bolt, a nut).

Figure 6:
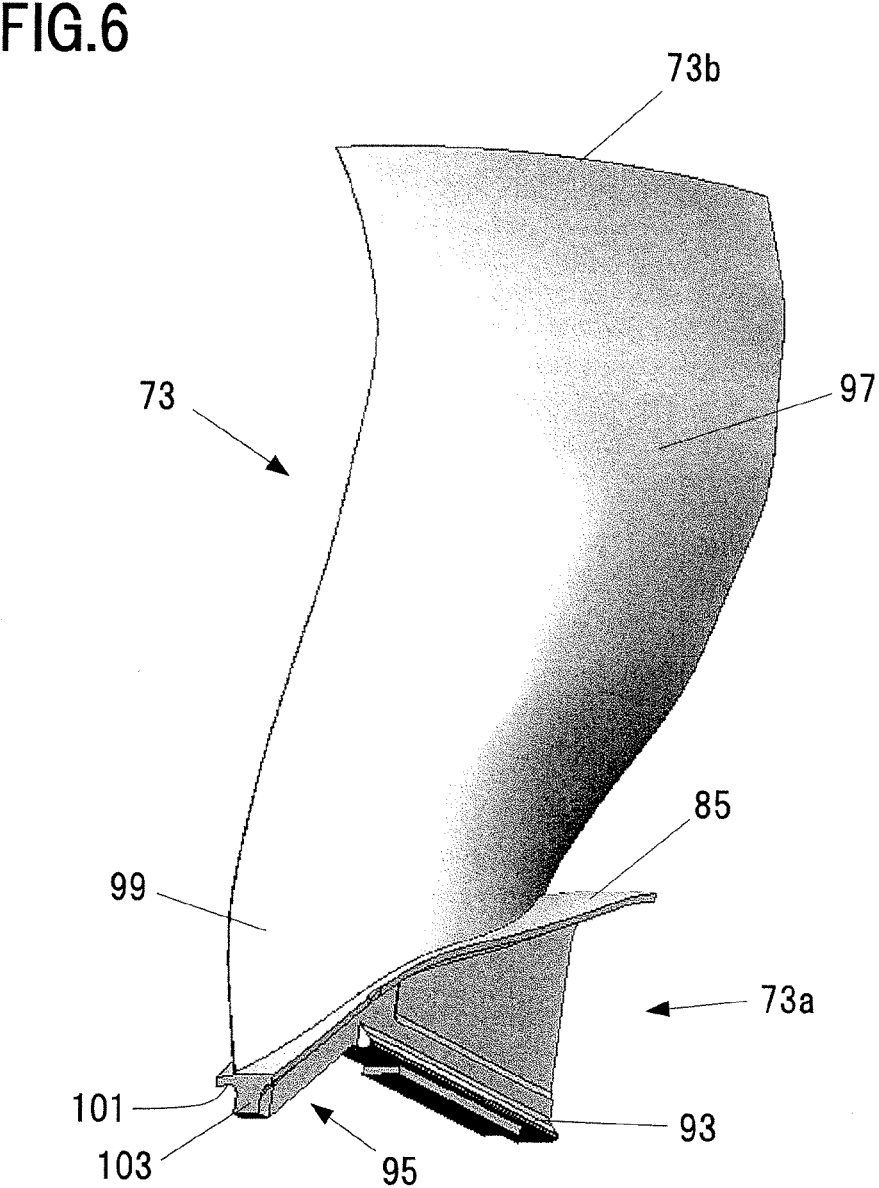
FIG. 6 is a perspective view showing the fan rotor blade of FIG. 5.
Figure 7:
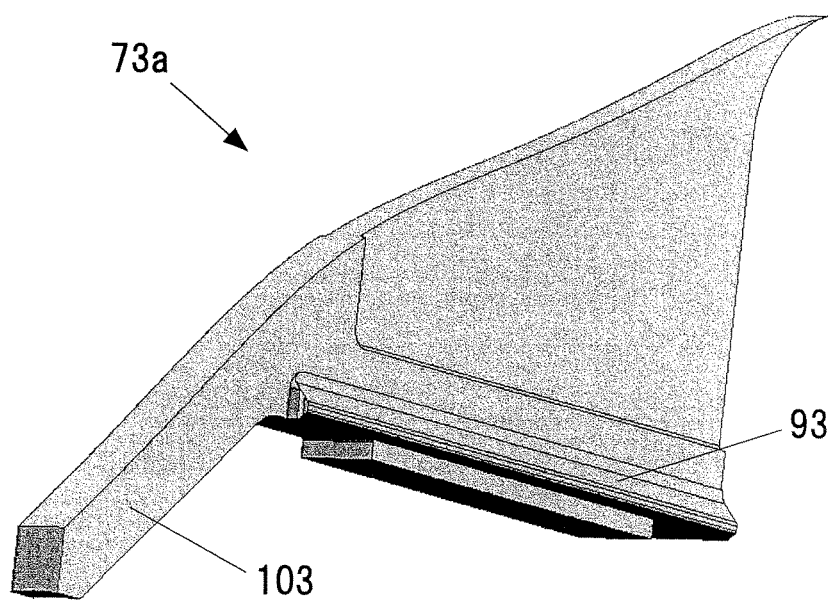
FIG. 7 is a perspective view showing a root of the fan rotor blade.

FIG. 6 is a perspective view showing the whole fan rotor blade 73, and FIG. 7 is a perspective view showing a portion of the fan rotor blade 73, and shows the structure of the radial inside from the platform part 85.

As shown in FIGS. 5 to 7, the fan rotor blade 73 has a root (hub) 73a located at an end at the side of the rotary disk 75, and a tip 73b located at an outer end in the radial direction of the rotary disk 75, and extends from the root 73a to the tip 73b.

The root 73a has an attached part 93 attached to the rotor blade fixing part 75a of the rotary disk 75, and an extension part 95 extending toward the upstream side from an upstream end of the attached part 93.

Additionally, in this embodiment, the fan rotor blade 73 is able to suck air in the vicinity of the center of rotation, a substantial inlet hub diameter is zero or close to zero, and its hub/tip ratio is 0 to 0.35.

According to this embodiment, an upstream end of the extension part 95 is a free end. That is, the extension part 95 of the root 73a is not engaged or coupled with the spin cone 87, but is separated from the spin cone 87.

Additionally, a blade part of the fan rotor blade 73 located within the airflow passage 77 includes a main fan rotor blade part 97 extending toward the radial outside from the attached part 93 to the tip 73b, and a fan rotor blade front part 99 extending toward the radial outside from the extension part 95. The centrifugal force and fluid pressure which act on the main fan rotor blade part 97 are supported by the attached part 93, and the centrifugal force and fluid pressure which act on the fan rotor blade front part 99 are supported by the extension part 95. The main fan rotor blade part 97 and the fan rotor blade front part 99 are integrally formed.

Additionally, in this embodiment, the attached part 93 is located radially outside the free end of the extension part 95. For example, the extension part 95, as shown in FIG. 5, may be inclined from the axial direction Z of a rotary shaft at an angle along the inner circumferential surface 79 of the airflow passage 77, and extends toward the upstream side from the upstream end of the attached part 93. In other words, the extension part 95 is inclined from the axial direction Z and extends so that the position of the extension part 95 changes toward the radial inside as the position shifts to the upstream side.

Figure 8:
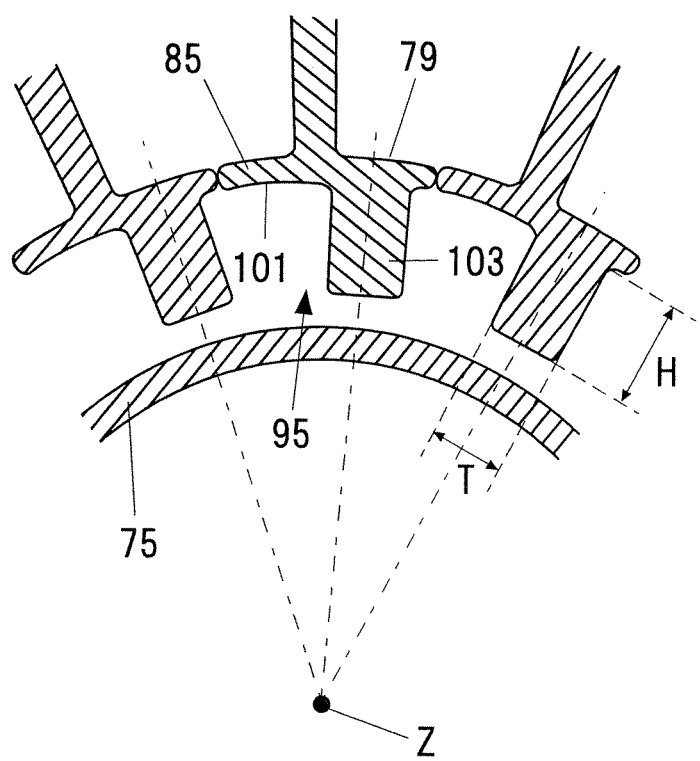
FIG. 8 is a sectional view taken along a line A-A of FIG. 5.

FIG. 8 is a sectional view taken along a line A-A of FIG. 5. As shown in FIG. 8, the extension part 95 has a radial inside surface 101, and a rib 103 protruding radially inward from the radial inside surface 101.

In this embodiment, as shown in FIG. 8, the radial inside surfaces 101 of the extension parts 95 of the plurality of fan rotor blades 73 form an inner circumferential surface, and this inner circumferential surface becomes uneven in the circumferential direction, thereby forming a rib structure.

Figure 9:
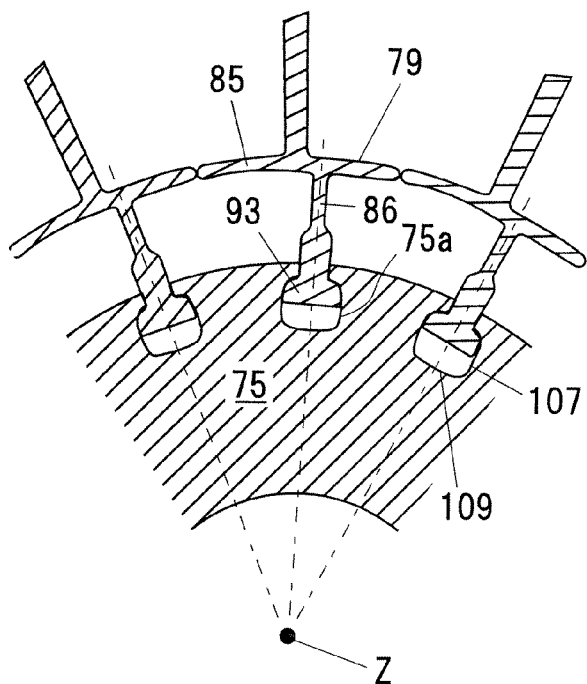
FIG. 9 is a sectional view taken along a line B-B of FIG. 5.

FIG. 9 is a sectional view taken along a line B-B of FIG. 5. In an example of FIG. 9, the rotor blade fixing part 75a of the rotary disk 75 is a dovetail groove, and the attached part 93 of the fan rotor blade 73 is a dovetail part which is engaged with the dovetail groove.

In the rotary disk 75, a plurality of (for example, 18) the dovetail grooves 75a is provided at certain angle intervals (for example, 20°) in the circumferential direction. Additionally, the dovetail groove 75a extends parallel to the axis Z of the rotary shaft from a leading edge of the rotary disk 75 to a trailing edge thereof in the example of FIG. 5.

The dovetail part 93 is provided at an inner end of the main fan rotor blade part 97, extends parallel to the Z axis of the rotary shaft similarly to the dovetail groove 75a of the rotary disk 75, and is adapted to be able to fit into the dovetail groove 75a.

Additionally, the dovetail part 93 is configured so that not only the centrifugal force and fluid pressure which act on the main fan rotor blade part 97 but the centrifugal force and fluid pressure which act on the fan rotor blade front part 99 are transmitted to the rotary disk 75. Therefore, the dovetail part 93 and the dovetail groove 75a are set to large dimensions to such a degree that the forces which act not only on the main fan rotor blade part 97 but on the fan rotor blade front part 99 can be supported by the rotary disk 75.

Moreover, as shown in FIG. 9, the dovetail part 93 and the platform part 85 are integrally coupled by a shank (neck part)

86 whose thickness in the circumferential direction becomes small. Weight saving can be attained by providing such a shank 86.

Additionally, the dovetail part 93, as shown in FIG. 5, has a vertical rear surface 93a which extends in a direction vertical to the axial direction at its rear end.

Corresponding to this vertical rear surface 93a, a rear retainer 105 is fixed to a rear end surface 75b (trailing edge) of the rotary disk 75 by a connecting fitting 104 (for example, a bolt, a nut). The front surface of the rear retainer 105 is brought into close contact with the vertical rear surface 93a so as to prevent backward movement of the dovetail part 93.

By this configuration, the surface pressure of the contact surface of the rear retainer 105 can be made substantially constant, and the internal stress generated in the rear retainer 105 can be reduced.

As such, the rear retainer 105 which extends in the direction vertical to the Z axis is provided at a rear end of the rotary disk 75, and the rear end surface 75b of the dovetail part 93 is supported by the rear retainer 105. In addition, the rear retainer 105 may be formed integrally with the rotary disk 75, without using the above connecting fitting. Additionally, an axial fixing means of the fan rotor blade 73 is not limited to the above-described vertical rear surface 93a and rear retainer 105, and other well-known means may be used independently or in combination.

Figure 10A:
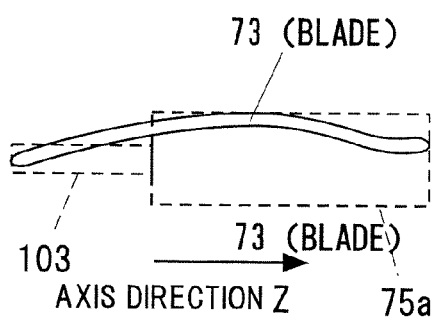
FIG. 10A is a view seen in the direction of an arrow at a line C-C of FIG. 5.
Figure 10B:
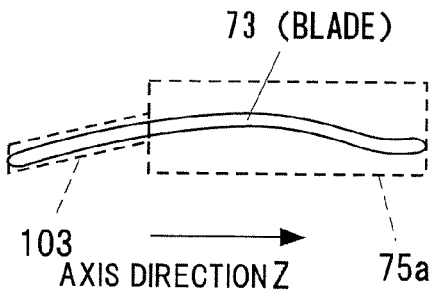
FIG. 10B is a view seen in the direction of an arrow at a line C-C of FIG. 5.

Additionally, FIGS. 10A and 10B are views seen in the direction of the arrow at a line C-C of FIG. 5, and shows the shape of the fan rotor blade 73 at the inner circumferential surface 79, and the shape of the rib 103 and the dovetail part 93 seen in the direction of the arrow at the line C-C by a broken line. Although the rib 103 may be formed parallel to the axial direction as shown in FIG. 10A, the rib 103 can be formed along the shape of a blade part of the inner circumferential surface 79, as shown in FIG. 10B, in order to support the fan rotor blade 73 more properly.

[Effect]

In the above-described fan rotor blade support structure 70, the upstream end of the extension part 95 provided at the root 73a of the fan rotor blade 73 is a free end. Accordingly, the centrifugal force which acts on this free end can be properly supported by the rotary disk 75 via the attached part 93. Additionally, when the attached part 93 is located radially outside the free end of the extension part 95, the distance between the attached part 93 (or the root 73a) and the tip 73b can be made relatively small. Accordingly, excessive stress can be prevented from being generated in the attached part 93. Additionally, the upstream end of the extension part 95 of the root 73a is not engaged and coupled with a member (for example, the spin cone 87) located at the upstream end of the rotary disk 75, but is used as the free end. Thus, the centrifugal force which acts on this free end does not directly act on the above member, such as the spin cone 87. Accordingly, an excessive stress can be prevented from being generated in the above member, such as the spin cone 87.

Consequently, even when the hub/tip ratio of the fan rotor blade 73 is set to 0.35 or less by the above fan rotor blade support structure 70, an excessive stress can be prevented from being generated in the root 73a of the fan rotor blade 73 and an excessive stress can also be prevented from being generated in the spin cone 87 while properly supporting the centrifugal force of the front part of the fan rotor blade 73.

Additionally, the rib 103 protruding radially inwards from the radial inside surface 101 of the extension part 95 is provided. Thus, the deformation caused by the centrifugal force of the fan rotor blade front part 99 which extends radially outwards from the extension part 95 can be suppressed by the rib 103.

[Turbofan Engine Having Fan Rotor Blade Support Structure]

The fan rotor blade support structure 70 according to the embodiment described above can be applied to a turbofan engine.

Such a turbofan engine may have the same configuration as FIG. 1, and is provided with a fan rotor blade 73 for sucking air, a compressor 3 for compressing the air from the fan rotor blade 73, a combustor 5 for burning the compressed air from the compressor 3, a turbine 7 rotationally driven by the combustion gas from the combustor 5, and a rotary disk 75 coupled with the turbine 7, rotating integrally with the turbine 7, and having the fan rotor blade 73 attached to the outer circumferential part thereof. The above fan rotor blade support structure 70 can be applied to this turbofan engine. In addition, the configuration and operation of the fan rotor blade support structure 70 in this case are the same as those described above.

Other Embodiments

In the above-described embodiment, the attached part 93 and the rotor blade fixing part 75a are configured as a parallel dovetail structure. However, the attached part 93 and the rotor blade fixing part 75a may be configured as an inclined dovetail structure. Additionally, the attached part 93 and the rotor blade fixing part 75a may be configured as suitable structures other than the dovetail structure.

Figure 11:
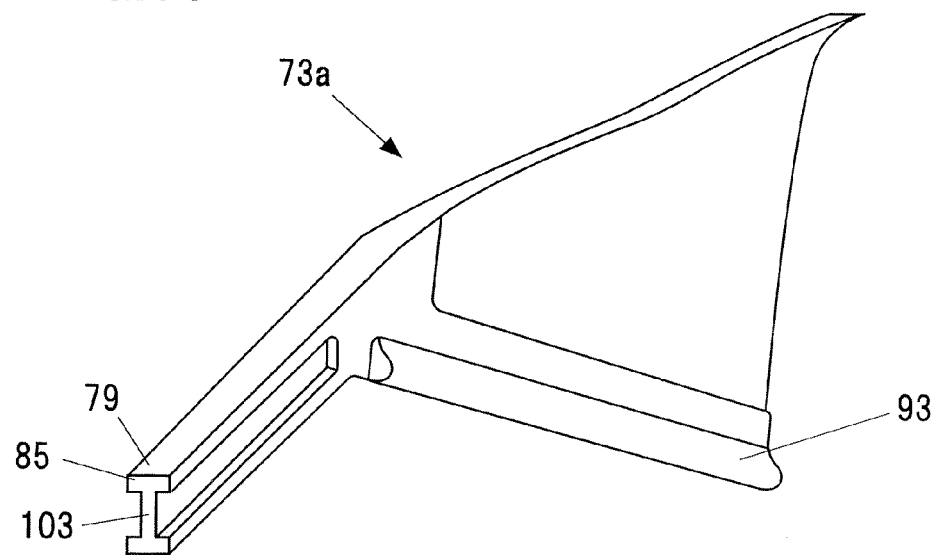
FIG. 11 is a perspective view showing other configurations of the rib.

In the above-described embodiment, the cross-sectional shape of a portion formed by combining the rib 103 and the platform part 85 in the extension part 95 shown in FIG. 8 is substantially T-shaped, but may be other suitable cross-sectional shapes having a large section modulus. For example, the cross-sectional shape of a portion formed by combining the rib 103 and the platform part 85 may be substantially lateral H-shaped like FIG. 11.

In the above-described embodiment, the thickness T and height H of the rib 103 shown in FIG. 8 are almost constant in the axial direction. However, at least either of the thickness T in the circumferential direction and radial height H of the rib 103 may gradually become small as the position shifts to the axial upstream side from a boundary position between the attached part 93 and the extension part 95. This can increase the strength of the extension part 95 and the rib 103.

Figure 12A:
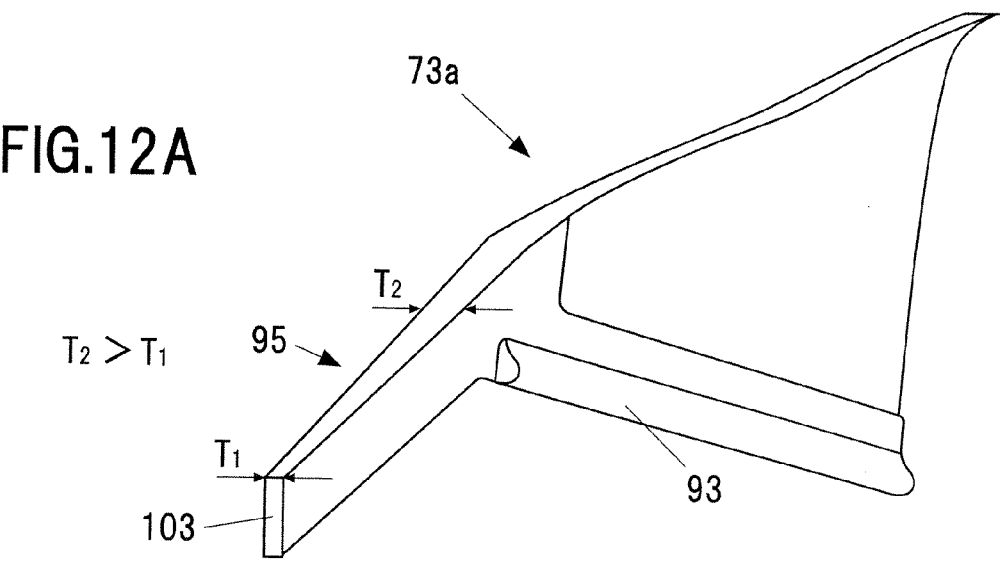
FIG. 12A is a perspective views showing the shape of the rib.

In the example FIG. 12A, the thickness of the rib 103 in the circumferential direction is $T_2$ at the boundary position between the attached part 93 and the extension part 95, gradually becomes small as the position shifts toward the axial upstream side from here, and is $T_1$ at the upstream end.

Figure 12B:
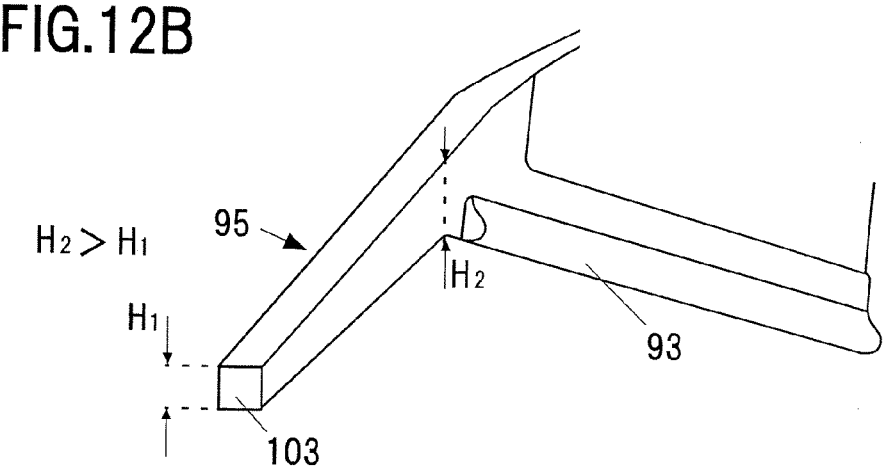
FIG. 12B is a perspective views showing another shape of the rib.

In the example FIG. 12B, the radial height of the rib 103 is $H_2$ at the boundary position between the attached part 93 and the extension part 95, gradually becomes small as the position shifts toward the axial upstream side from here, and is $H_1$ at the upstream end.

Figure 12C:
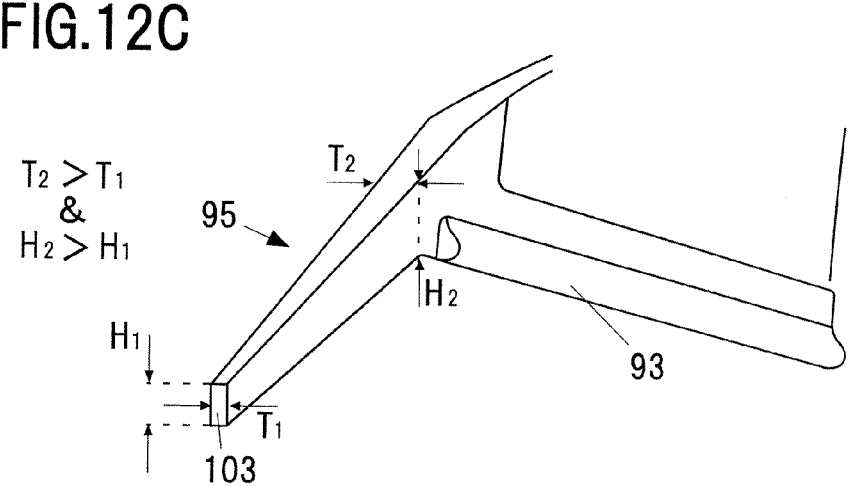
FIG. 12C is a perspective views showing another shape of the rib.

In the example FIG. 12C, the thickness in the circumferential direction and the radial height of the rib 103 are respectively $T_2$ and $H_2$ at the boundary position between the attached part 93 and the extension part 95, gradually become small as the position shifts toward the axial upstream side from here, and are respectively $T_1$ and $H_1$ at the upstream end.

Figure 12D:
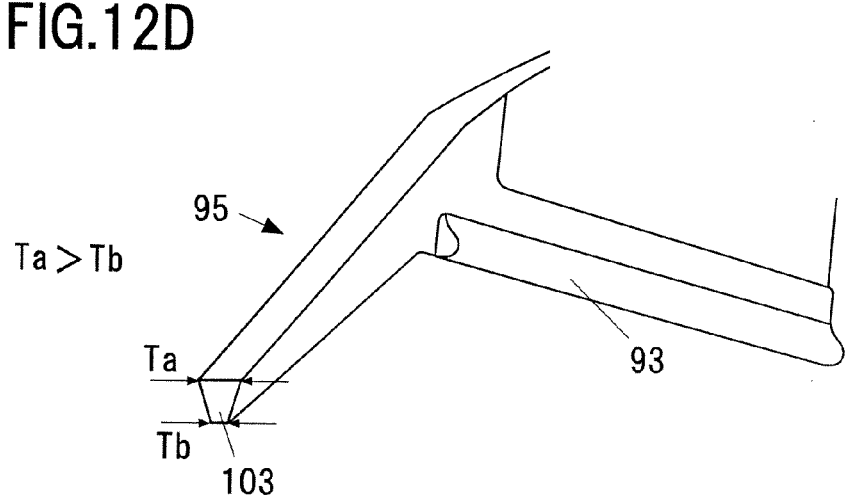
FIG. 12D is a perspective views showing another shape of the rib.

Additionally, as shown in FIG. 12D, the thickness of the rib 103 in the circumferential direction may be Ta at a radial outside surface, may be gradually made small as the position shifts to the radial inside from here, and may be Tb at a radial inside surface. This can also increase the strength of the extension part 95 and the rib 103. In addition, the configuration in which the thickness of the rib 103 in the circumferential direction is gradually made small as the position shifts to the radial inside like FIG. 12D may be combined with any of the configurations of FIGS. 12A to 12C.

Figure 13A:
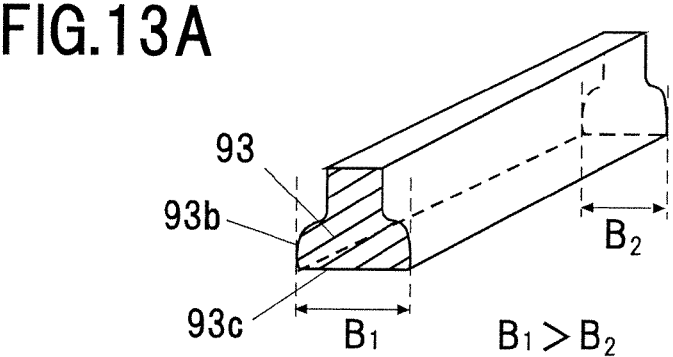
FIG. 13A is perspective views showing the configuration of an attached part.
Figure 13B:
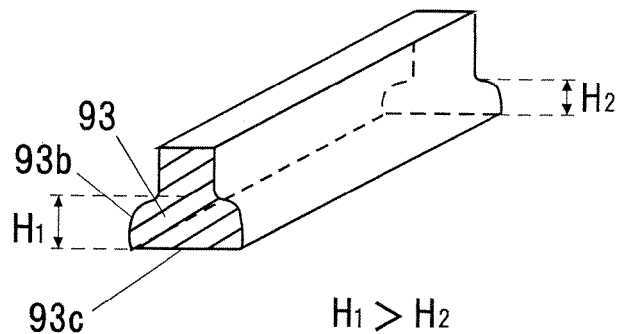
FIG. 13B is perspective views showing another configuration of an attached part.

Additionally, when the inclined dovetail structure is adopted for the attached part 93 and the rotor blade fixing part 75a, the following configurations (1) to (4) may be adopted. FIGS. 13A and 13B are perspective views showing other configurations of the attached part 93 (dovetail part) of one fan rotor blade 73 in FIG. 9.

(1) The dovetail part 93, as shown in FIG. 13A, has a tapered side part 93b with constant gradient by which a width $B_2$ in the circumferential direction at the rear side is smaller than a width $B_1$ in the circumferential direction at the front side. Additionally, the dovetail groove 75a has a tapered groove side part 107 (refer to FIG. 9) which fits to the tapered side part 93b of the dovetail part 93. In this case, the whole tapered side part 93b may be configured so as to fit to and come into contact with the tapered groove side part 107.

By this configuration, the tapered side part 93b and the tapered groove side part 107 come into contact with each other in a wedge shape over the wide area, and the component force, along the dovetail groove 75a, of the centrifugal force which acts on the fan rotor blade 73 can be distributed to the circumferential-direction compressive force of the rotary disk 75. Accordingly, the component force of the centrifugal force can be surely supported by a low stress over the wide area.

(2) The dovetail part 93, as shown in FIG. 13B, has a tapered bottom part 93c with constant gradient by which a radial bottom surface depth $H_2$ at the rear side is smaller than a radial bottom surface depth $H_1$ at the front side. Additionally, the dovetail groove 75a has a tapered groove bottom part 109 (refer to FIG. 9) which fits to the tapered bottom part 93c of the dovetail part 93. In this case, unlike FIG. 9, the whole tapered bottom part 93c may be configured so as to fit to and come into contact with the tapered groove bottom part 109.

By this configuration, the tapered bottom part 93c and the tapered groove bottom part 109 come into contact with each other in a wedge shape over the wide area, and the component force, along the dovetail groove 75a, of the centrifugal force which acts on the fan rotor blade 73 can be distributed to the radial force of the rotary disk 75. Accordingly, the component force of the centrifugal force can be surely supported by a low stress over the wide area.

Figure 14A:
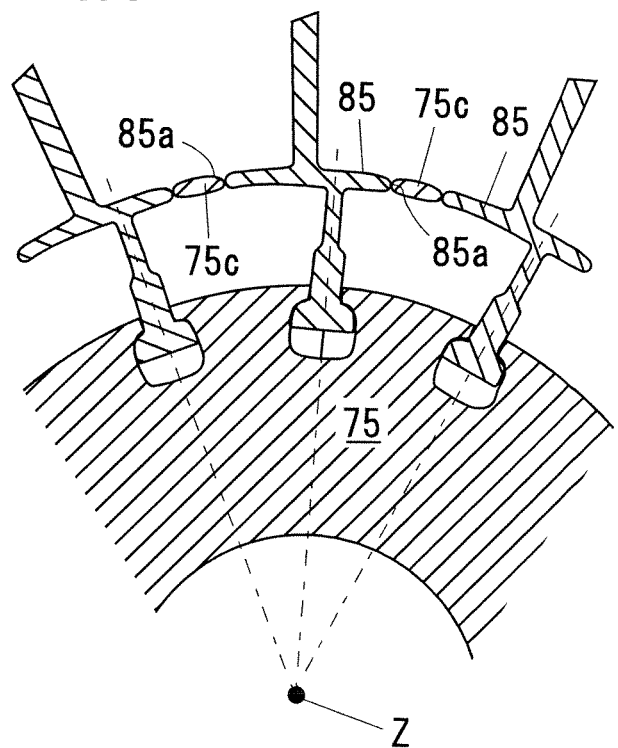
FIG. 14A shows another configuration of the vicinity of the dovetail part.
Figure 14B:
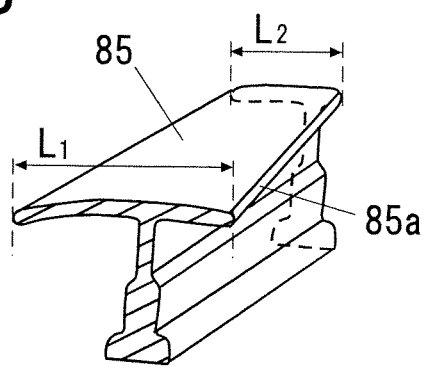
FIG. 14B is a perspective view of a platform part of FIG. 14A.

(3) FIG. 14A shows another configuration of the vicinity of the dovetail part 93 corresponding to FIG. 9. FIG. 14B is a perspective view of a platform part 85 of FIG. 14A. The platform part 85 located radially outside the dovetail part 93 has a pair of tapered side parts 85a with constant inclination by which a circumferential-direction distance $L_2$ at the rear side is smaller than a circumferential-direction distance $L_1$ at the front side. Additionally, the rotary disk 75 has a tapered protruding part 75c which fits to the tapered side part 85a. The tapered protruding part 75c may be formed integrally with the rotary disk 75. In this case, the tapered side part 85a may be configured so as to fit to and come into contact with the tapered protruding part 75c over the whole area in the direction in which the tapered side part extends in a wedge shape.

By this configuration, the tapered side part 85a and the tapered protruding part 75c come into contact with each other in a wedge shape over the wide area, and the component force, along the dovetail groove 75a, of the centrifugal force which acts on the fan rotor blade 73 can be distributed to the circumferential-direction compressive force of the rotary disk 75. Accordingly, the component force of the centrifugal force can be surely supported by a low stress over the wide area. In addition, even in this case, the platform part 85 located radially outside the extension part 95 may have the same configuration as FIG. 8.

(4) All the vertical rear surface 93a and the rear retainer 105, the tapered side part 93b and the tapered groove side part 107, and the tapered bottom part 93c and the tapered groove bottom part 109, and the tapered side part 85a and the tapered protruding part 75c, which have been described above, are not indispensable, and the component force of the centrifugal force can be surely supported by a low stress over the wide area by one or some of them.

It should be understood that the invention is not limited to the above-described embodiment, but various modifications can be made without departing from the spirit and scope of the invention.

The invention claimed is:

1. A fan rotor blade support structure for fixing a fan rotor blade for air introduction to a rotary disk to allow the rotary disk to support the fan rotor blade, the fan rotor blade support structure comprising:
   (a) a main fan rotor blade part;
   (b) a fan rotor blade front part;
   (c) the rotary disk, wherein the rotary disk has a rotor blade fixing part;
   (d) a root located at an end at a side of the rotary disk, wherein the root has
      (i) an attached part, wherein the attached part is disposed radially in an inside of the main fan rotor blade part, wherein the attached part supports a centrifugal force that acts on the main fan rotor blade part, wherein the attached part is attached to the rotor blade fixing part, and wherein the attached part has a radial inner end; and
      (ii) an extension part, wherein the extension part extends from the attached part toward an upstream side, wherein an upstream end of the extension part is a free end, wherein the extension part is located radially in an inside of the main fan rotor blade front part, wherein the extension part supports a centrifugal force that acts on the fan rotor blade front part, and wherein the free end of the extension part is located radially inside the radial inner end of the attached part;
   (e) a tip located at an outer end in a radial direction of the rotary disk, wherein the fan rotor blade extends from the root to the tip; and
   (f) an inlet hub, wherein the inlet hub has a substantial inlet hub diameter of zero or close to zero and a hub/tip ratio of 0 to 0.35,
   wherein the fan rotor blade is disposed to suck air in the vicinity of the center of rotation, wherein the main fan rotor blade part extends toward a radial outside of the fan rotor blade from the attached part to the tip, and wherein the fan rotor blade front part extends toward the radial outside of the fan rotor blade from the extension part.

2. The fan rotor blade support structure according to claim 1, wherein the extension part has a radial inside surface, and wherein a rib protrudes radially inwards from the radial inside surface of the extension part.

3. A turbofan engine comprising:
   (a) a fan rotor blade disposed to suck air;
   (b) a compressor disposed to compress air from the fan rotor blade;
   (c) a combustor disposed to burn compressed air from the compressor;

(d) a turbine that is rotationally driven by a combustion gas from the combustor; and
(e) a rotary disk that is coupled with the turbine, wherein the rotary disk is disposed to rotate integrally with the turbine, wherein the rotary disk has the fan rotor blade attached to an outer circumferential part thereof, and wherein the rotary disk has a rotor blade fixing part,
wherein the fan rotor blade includes
  (i) a main fan rotor blade part;
  (ii) a fan rotor blade front part;
  (iii) a root located at an end at a side of the rotary disk, wherein the root has
    (1) an attached part, wherein the attached part is disposed radially in an inside of the main fan rotor blade part, wherein the attached part supports a centrifugal force that acts on the main fan rotor blade part, and wherein the attached part has a radial inner end;
    (2) an extension part, wherein the extension part extends from the attached part toward an upstream side, wherein an upstream end of the extension part is a free end, wherein the extension part is located radially in an inside of the main fan rotor blade front part, wherein the extension part supports a centrifugal force that acts on the fan rotor blade front part, and wherein the free end of the extension part is located radially inside the radial inner end of the attached part;
  (iv) a tip located at an outer end in a radial direction of the rotary disk, wherein the fan rotor blade extends from the root to the tip; and
  (v) an inlet hub, wherein the inlet hub has a substantial inlet hub diameter of zero or close to zero and a hub/tip ratio of 0 to 0.35,
wherein the fan rotor blade is disposed to suck air in the vicinity of the center of rotation, wherein the main fan rotor blade part extends toward a radial outside of the fan rotor blade from the attached part to the tip, and wherein the fan rotor blade front part extends toward the radial outside of the fan rotor blade from the extension part.

* * * * *